(12) United States Patent
Holcombe et al.

(10) Patent No.: US 12,312,984 B2
(45) Date of Patent: May 27, 2025

(54) CYLINDER BLOCK BAFFLE FOR SEPARATING OIL FROM CRANKCASE GASSES

(71) Applicant: FORD GLOBAL TECHNOLOGIES, LLC, Dearborn, MI (US)

(72) Inventors: Erzabeth J. Holcombe, Northville, MI (US); Joshua D. Simon, Sylvania, OH (US); Theodore Beyer, Howell, MI (US); Christopher K. Palazzolo, Ann Arbor, MI (US); Louis Van Hout, Berkley, MI (US); John McNally, Garden City, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 226 days.

(21) Appl. No.: 17/876,157

(22) Filed: Jul. 28, 2022

(65) Prior Publication Data
US 2024/0035404 A1 Feb. 1, 2024

(51) Int. Cl.
*F01M 13/04* (2006.01)
*B01D 45/08* (2006.01)

(52) U.S. Cl.
CPC ............. *F01M 13/04* (2013.01); *B01D 45/08* (2013.01); *F01M 2013/0433* (2013.01)

(58) Field of Classification Search
CPC . F01M 13/04; F01M 2013/0433; B01D 45/08
See application file for complete search history.

(56) References Cited

U.S. PATENT DOCUMENTS

| | | | |
|---|---|---|---|
| 4,175,937 A | 11/1979 | Brandau et al. | |
| 4,502,424 A | 3/1985 | Katoh et al. | |
| 4,627,406 A * | 12/1986 | Namiki | F01M 13/04 123/573 |
| 4,844,032 A * | 7/1989 | Groeger | F01M 13/0416 123/196 R |
| 5,617,834 A | 4/1997 | Lohr | |
| 6,345,614 B1 * | 2/2002 | Shureb | F01M 13/04 123/573 |
| 6,477,991 B2 * | 11/2002 | Moller | F01M 13/04 123/73 PP |
| 7,537,626 B2 * | 5/2009 | Kasuya | B01D 45/06 55/337 |

(Continued)

Primary Examiner — Kurt Philip Liethen
(74) Attorney, Agent, or Firm — Vincent Mastrogiacomo; Brooks Kushman P.C.

(57) ABSTRACT

An oil separation baffle is mounted in an oil gallery of an internal combustion engine. A lower section includes a bottom wall and side window openings. Crankcase gasses flow into the side window openings, through the lower section, and through the top opening. An upper section includes a plurality of ribs extending horizontally between a front side wall of the upper section and a rear side wall of the upper section. The plurality of ribs are vertically spaced apart from each other and extend from a first wall of the oil gallery toward a second wall of the oil gallery to an opening defined between a distal end of the rib and the other of the first and second walls of the oil gallery. The bottom planar wall separates larger oil droplets and the ribs separate smaller oil particles from the crankcase gasses and return the oil to the crankcase.

20 Claims, 4 Drawing Sheets

(56) References Cited

U.S. PATENT DOCUMENTS

| | | | |
|---|---|---|---|
| 8,499,750 B2* | 8/2013 | Koyamaishi | F01M 13/04 |
| | | | 123/573 |
| 8,887,704 B2 | 11/2014 | Spix et al. | |
| 9,816,410 B2* | 11/2017 | Torella | F01M 13/04 |
| 10,731,529 B2* | 8/2020 | Sazawa | F01M 13/04 |
| 10,837,332 B2* | 11/2020 | Tada | B01D 46/80 |
| 2001/0010988 A1* | 8/2001 | Suganuma | F01M 1/02 |
| | | | 440/88 L |

* cited by examiner

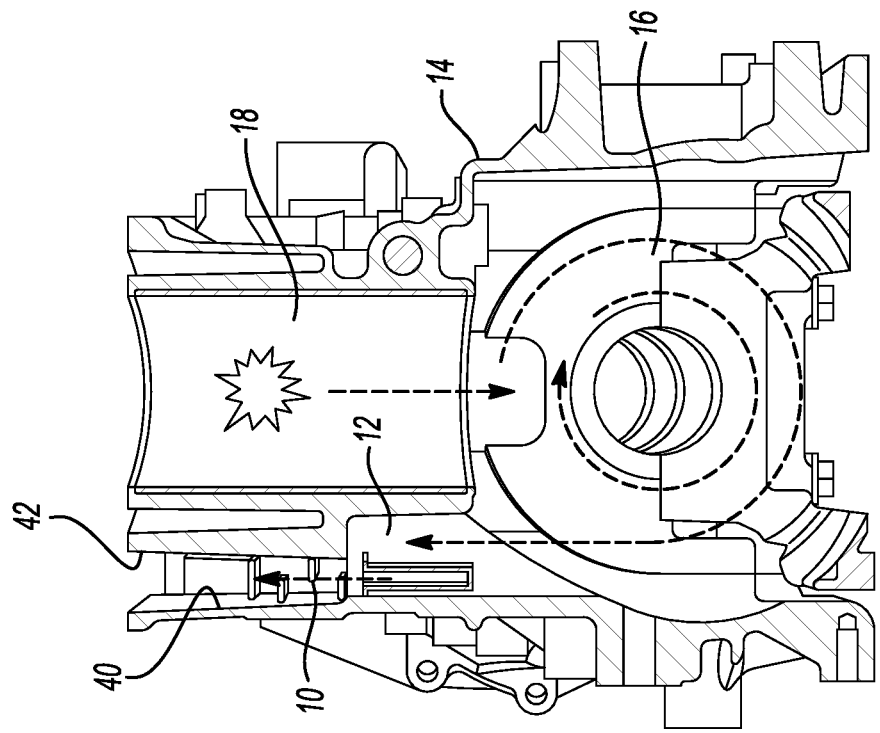
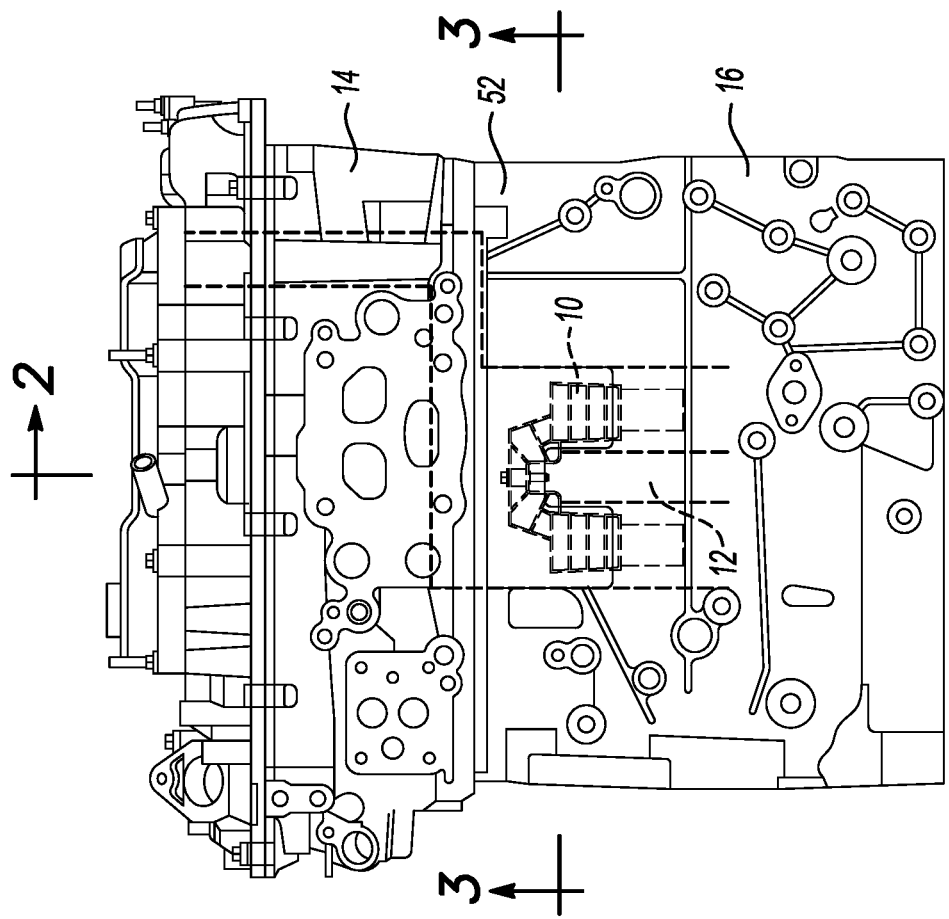

CYLINDER BLOCK BAFFLE FOR SEPARATING OIL FROM CRANKCASE GASSES

TECHNICAL FIELD

This disclosure relates to an apparatus for separating oil entrained in the engine ventilation system inside the cylinder block of an engine.

BACKGROUND

Engine ventilation systems clean oil from crankcase gases that are combined with fresh air from the intake manifold and consumed by the engine. One problem with engine ventilation systems is that entrained oil must be separated from the crankcase gases and returned to the crankcase to minimize oil consumption and emissions.

This disclosure is directed to solving the above problems and other problems as summarized below.

SUMMARY

According one aspect of this disclosure, an apparatus is disclosed for separating oil from crankcase gasses in the oil gallery of an internal combustion engine. The apparatus comprises a baffle adapted to be mounted in an oil gallery defined by a cylinder block of an internal combustion engine having a crankshaft extending in a longitudinal direction. The baffle includes a lower section and an upper section. The lower section includes a bottom wall facing downwardly toward the crankshaft and a first side entry window opening and a second side entry window opening facing in opposite longitudinal direction. The first and second side entry windows are defined by the bottom wall, a right side wall, a left side wall and a top edge of the lower section. The crankcase gasses flow into the first side entry window opening, the second side entry window, and through a top opening. The bottom planar wall restricts larger droplets of oil from entering the gallery. The upper section is disposed above the lower section and includes a plurality of ribs extending horizontally between a front side wall of the upper section and a rear side wall of the upper section. The plurality of ribs are vertically spaced apart from each other and each rib extends from one wall of the oil gallery toward another wall of the oil gallery to an opening defined between a distal end of the rib and the other of the first and second walls of the oil gallery. The openings are horizontally offset in a lateral direction, and the plurality of ribs define a passage for crankcase gasses that flow between the first and second walls of the oil gallery in the lateral direction to separate small oil droplets from the crankcase gasses and return the small oil droplets to the crankcase.

According to another aspect of this disclosure an apparatus is disclosed that comprises an oil separator mounted in one or more oil galleries of an internal combustion engine. The oil separator includes a front baffle and a rear baffle that include a lower section, an upper section and a bridging section. The bridging section connects the upper section of the front baffle to the upper section of the rear baffle. The lower section of the front baffle and the lower section of the rear baffle extend below the upper section of the front baffle and the upper section of the rear baffle, respectively. The lower sections of each of the front and rear baffles each include a bottom wall extending in a horizontal plane in the lateral and longitudinal directions to be oriented across a flow path of crankcase gasses vertically through the galleries to restrict large droplets of oil from entering the oil gallery. The lower section defines side openings extending vertically above the bottom walls and laterally between first and second sides of the oil gallery. The upper sections of the front and rear baffles each include front and rear walls that extend in a vertical plane and a transverse lateral plane. A plurality of right side ribs extend between the front and rear walls on a right side of the oil gallery and left side gas flow openings are defined by a distal end of the ribs and the left side of the oil gallery. A plurality of left side ribs extend on a left side of the oil gallery and right side gas flow openings are defined by a distal end of the ribs and the left side of the oil gallery. Crankcase gasses flow around a left side of the right side ribs and a right side of the left side ribs in a repeating pattern to separate small oil droplets from the crankcase gasses.

According to another aspect of this disclosure, an apparatus is disclosed for separating oil from crankcase gasses in the oil gallery of an internal combustion engine. The internal combustion engine includes a crankcase, a cylinder block, a cylinder head that defines an oil gallery, and a baffle assembled into the oil gallery. The baffle has a bottom wall facing the crankcase and right and left side walls extending above the bottom wall. The bottom wall and the right and left side walls define at least one side opening, the baffle also includes a front wall and a rear wall that each define a top end of the side openings. The front wall and rear wall extend vertically above the side openings. The front wall and the rear wall each support a plurality of ribs that extend between the front and rear walls. The ribs include right side ribs that define a set of left side openings between a distal end of the right side ribs and a left side wall of the oil gallery. Left side ribs define a set of right side openings between a distal end of the left side ribs and a right side wall of the oil gallery. Crankcase gasses flow around a right side of the left side ribs and a left side of the right side ribs to separate small oil droplets from the crankcase gasses.

The oil separator may also include a second baffle assembled into the oil gallery. The second baffle may have a second bottom wall facing the crankcase and right and left second side walls extending above the second bottom wall at right and left edges of the second bottom wall. The second bottom wall and the right and left second side walls define at least one second side opening. The second baffle also includes a second front wall and a second rear wall that each define a second top end of the second side openings and extend vertically above the second side openings. The second front wall and the second rear wall each support a second plurality of ribs that extend between the second front and second rear walls. The second plurality of ribs include second right side ribs that define a second set of second left side openings between a second distal end of the right side ribs and a second left side wall of the oil gallery. The second left side ribs define a second set of second right side openings between a second distal end of the second left side ribs and a second right side wall of the oil gallery. The second gas flow path flows around a second right side of second left side ribs and a second left side of a vertically adjacent second right side ribs to separate small oil droplets from crankcase gasses.

The above aspects of this disclosure and other aspects will be described below with reference to the attached drawings.

BRIEF DESCRIPTION OF THE DRAWINGS

FIG. 1 is a diagrammatic side view of an internal combustion engine that shows an oil separating baffle inside an oil gallery of the engine.

FIG. 2 is across-sectional view taken along the line 2-2 in FIG. 1.

DETAILED DESCRIPTION

Figure 3:
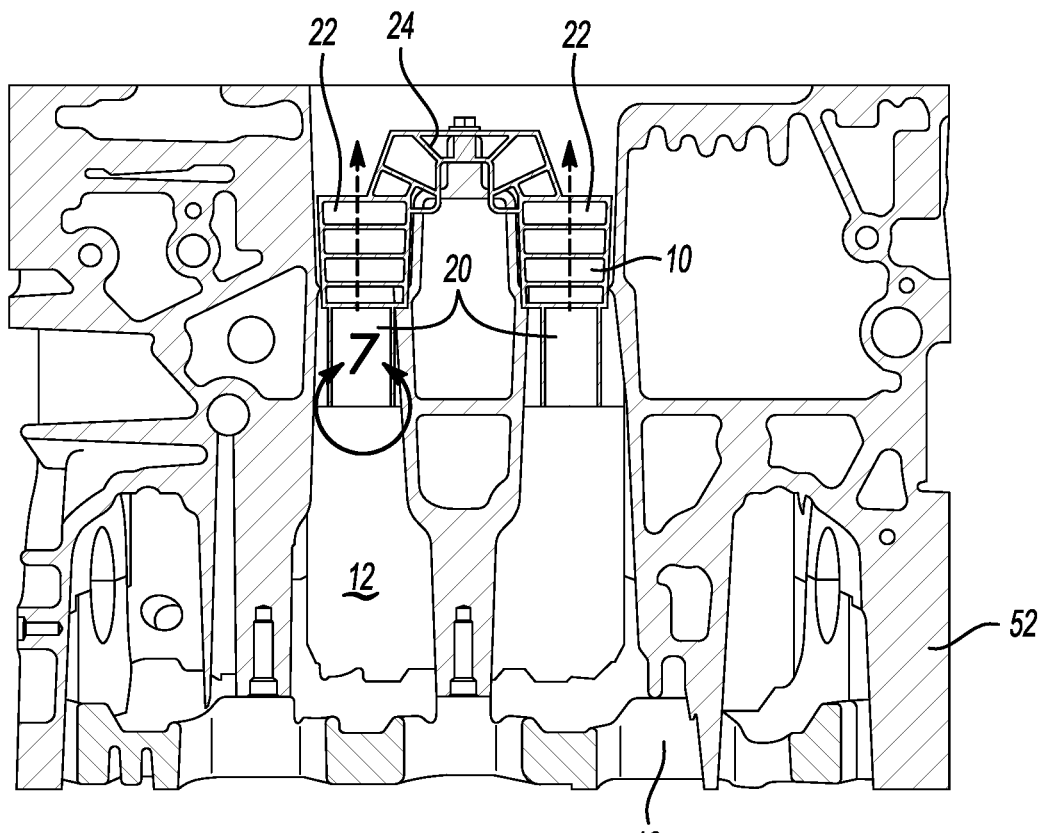
FIG. 3 is a fragmentary cross-sectional view taken along the line 3-3 in FIG. 1.

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Referring to FIG. 1, a baffle 10 for separating oil from crankcase gasses is diagrammatically shown to be disposed in an oil gallery 12 of an internal combustion engine 14. The baffle 10 partially blocks the flow of crankcase gasses through the gallery 12. Oil droplets and particles impinge upon the baffle 10 and drain back into the crankcase 16 of the engine 14.

Referring to FIG. 2, the internal combustion engine 14 is shown in a transverse cross-section with the baffle 10 disposed in the oil gallery 12. The dashed line arrows indicate the flow of gasses in the engine 14. The gasses flow from the cylinder 18, around the crankcase 16, and up the oil galleries 12 of the engine 14. When the gasses flow through the baffle 10, oil droplets and particles are removed and returned to the crankcase 16.

As used herein relative directions are based on the longitudinal direction being the direction that the cylinders 18 of the engine 14 are aligned. The transverse direction, or cross car direction, lies in the vertical plane perpendicular to the longitudinal direction. The horizontal direction lies in the horizontal plane and the longitudinal direction.

Figure 4:
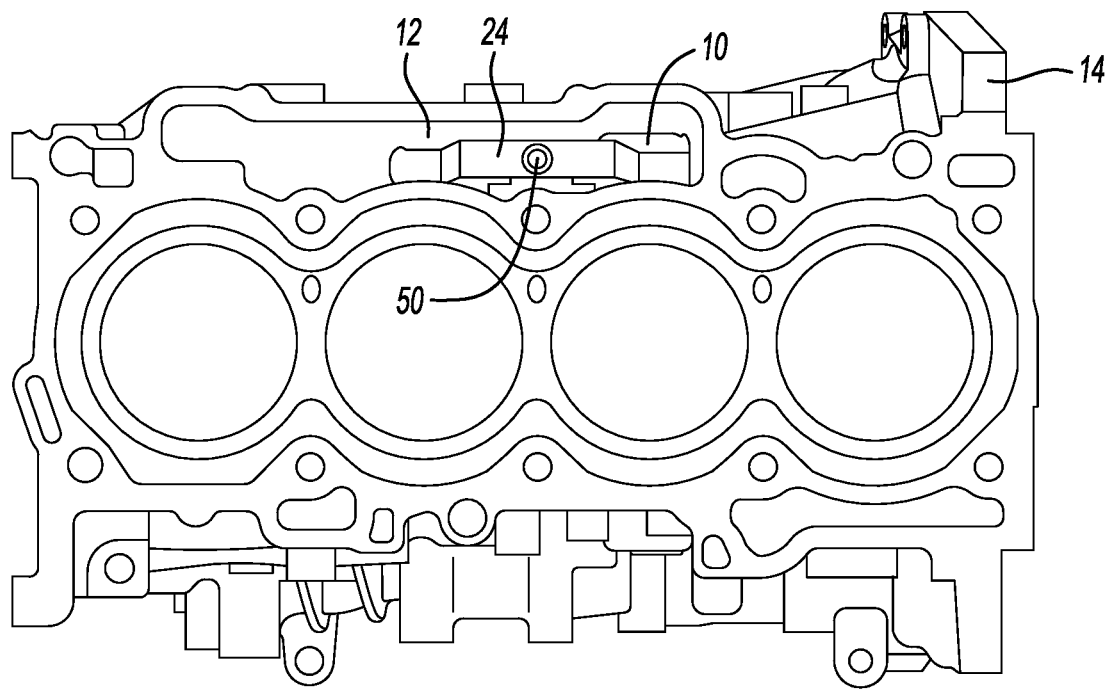
FIG. 4 is a diagrammatic top plan view of the internal combustion engine with the oil separating baffle.

Referring to FIGS. 3 and 4, the baffle 10 and internal combustion engine 14 are shown in cross-section with the baffle 10 being disposed in the oil gallery 12. The baffle has two lower sections 20 and two upper sections 22. The two upper sections 22 of two parts of the baffle are joined together by a bridge section 24. The structure and function of the baffle 10 will be described more specifically with reference to FIGS. 5-7 below.

Figure 5:
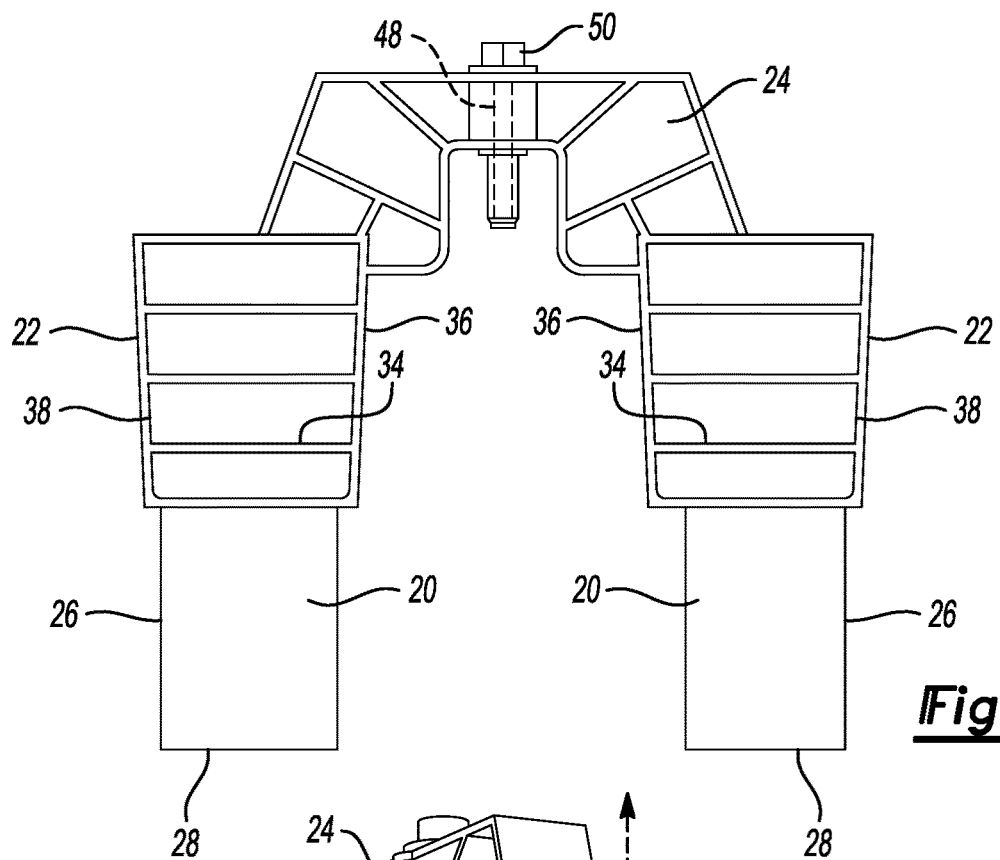
FIG. 5 is an elevation view of the oil separating baffle.

FIG. 5 shows the baffle 10 in isolation. The lower sections 20 each define a pair of side openings 26 that face opposite longitudinal directions. The lower sections 20 each include a bottom wall 28 that is oriented perpendicular to the flow of gasses from the crankcase 16 (shown in FIGS. 1 and 3). Large droplets of oil in the crankcase gasses impinge upon the bottom walls 28 and are separated from the crankcase gasses. The bottom walls 28 also divert the crankcase gasses outwardly in the longitudinal direction and that flow upwardly in a generally vertical direction toward side openings 26 (shown best in FIG. 6). The side openings 26 are defined by the bottom wall, the right side wall, the left side wall and a bottom edge of the front wall and the rear wall. The lower section 20 defines a top opening 32 (shown best in FIG. 6) through which the crankcase gasses flow into the upper section 22.

Figure 6:
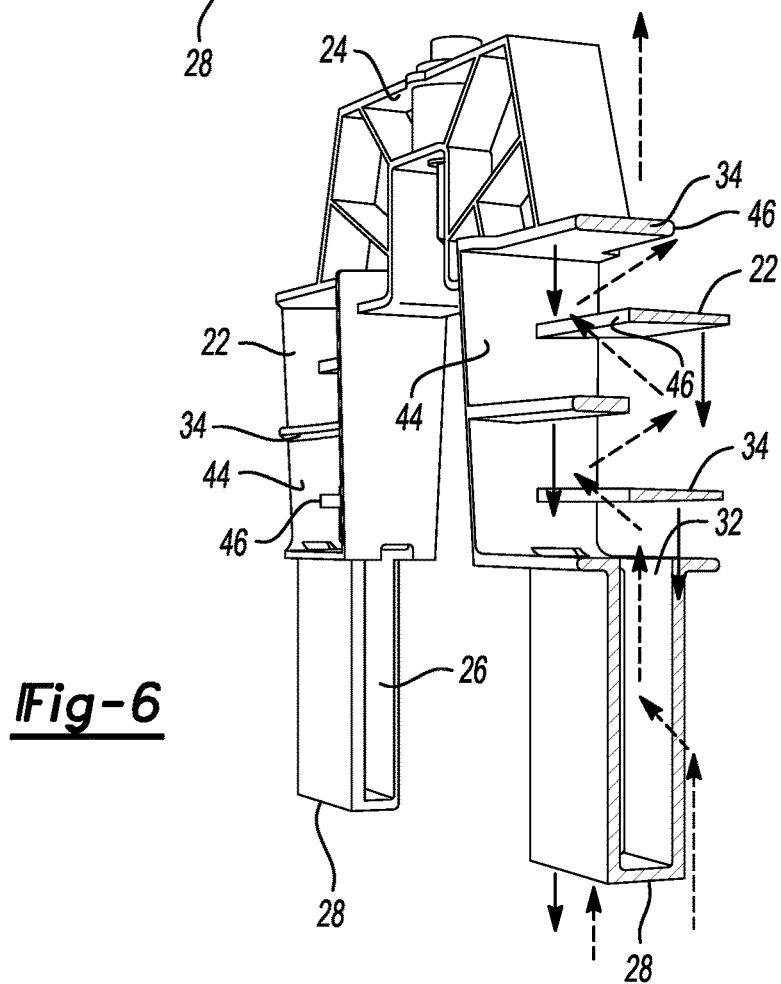
FIG. 6 is a perspective view of the oil separating baffle partially in cross-section with arrows illustrating the crankcase gasses and the return oil flow paths.
Figure 7:
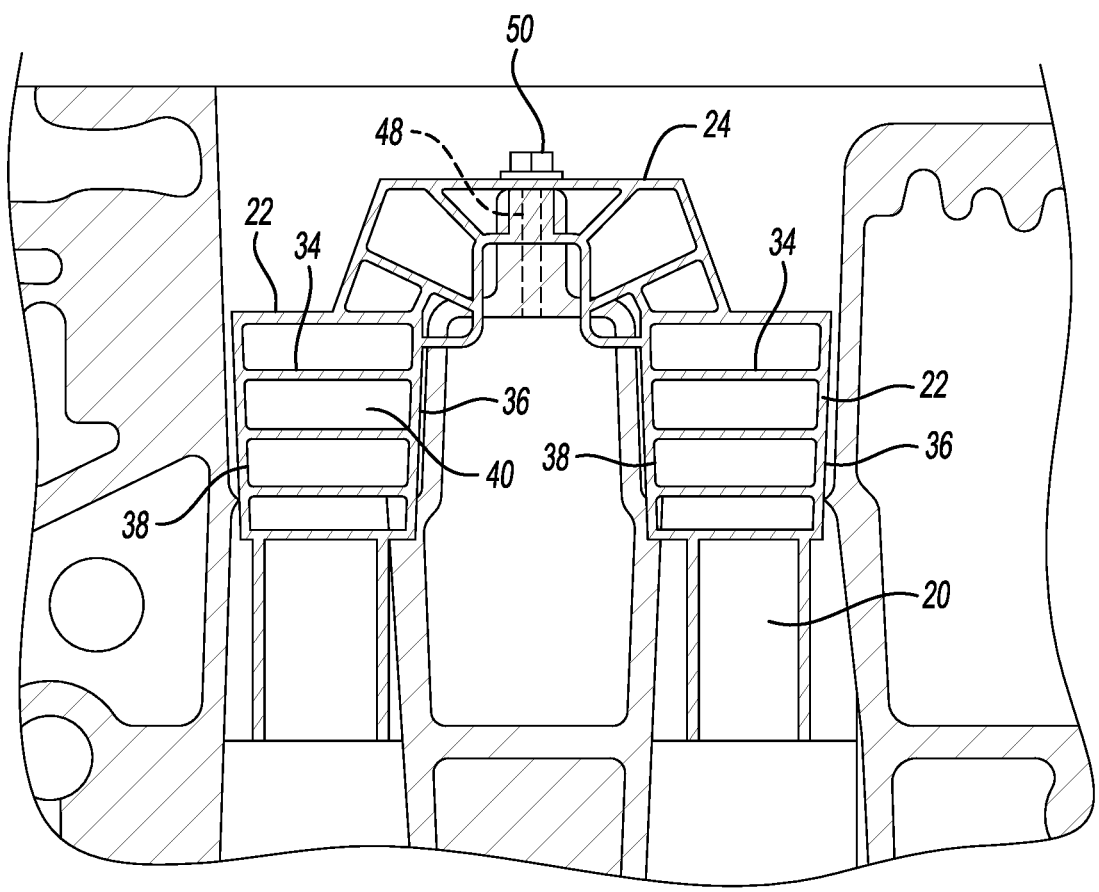
FIG. 7 is a fragmentary cross-section view of the oil separating baffle installed in the internal combustion engine oil gallery.

Referring to FIGS. 5-7, the upper sections 22 are each shown to include a plurality of ribs 34 extending horizontally between a front, or fore side wall, side wall 36 of the upper section 22 and a rear, or aft side wall, wall 38 of the upper section 22. The plurality of ribs 34 are vertically spaced apart from each other and are planar in shape. Each rib 34 extends from a first wall 40 (shown in FIG. 2) of the oil gallery 16 toward a second wall 42 (shown in FIG. 2) of the oil gallery 16 to an opening 44 defined between a distal end 46 of the rib 34 and the other of the first and second walls 40, 42 of the oil gallery 16. The openings 44, are rectangular gas flow openings, that are horizontally offset in a lateral direction and define a passage for crankcase gasses that flow between the first and second walls 40, 42 of the oil gallery 16 in the upward and lateral direction to separate small oil particles from the crankcase gasses and return the small oil particles to the crankcase 16.

The bridge section 24 connects the upper sections 22 of a first baffle and the second baffle and defines a fastener receiving opening 48. A fastener 50 assembles the bridge section 24 to in the fastener receiving opening 48 that is secured to the cylinder block 52 of the internal combustion engine 14.

Referring to FIG. 6, the flow of crankcase gasses is shown by the dashed lines to be a non-linear flow. Below the bottom wall 28 the dashed line arrow shows the crankcase gasses impinging upon the bottom wall 28 with a solid line below the bottom wall 28 illustrates the oil droplets falling back into the crankcase 16 (shown in FIGS. 1 and 2). Three dashed line arrows extending above the bottom wall 28 show the crankcase gasses flowing into the side openings 30, through the lower section 20, and through the top opening 32. The four angled dashed line arrows in the upper section 22 show the crankcase gasses flowing through the openings 44 defined by the distal end 46 of ribs 34 and the first and second walls 38, 40 of the oil gallery 16. The plurality of ribs 34 are impinged upon by the crankcase gasses to separate small particles of oil that are returned to the crankcase 16 as shown by the downwardly directed solid line arrows in the upper section 22. The dashed line arrow above the uppermost rib 34 shows the crankcase gasses flowing into the upper area of the internal combustion engine 14 where they are mixed with air drawn in by the intake manifold (not shown) and burned by the internal combustion engine 14.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments. In addition, the features of various implementing embodiments may be combined to form further embodiments of the invention.

What is claimed is:

1. An apparatus comprising:
a baffle adapted to be mounted in an oil gallery defined by a cylinder block of an internal combustion engine having a crankshaft extending in a longitudinal direction, the baffle having—
a lower section including a bottom wall facing downwardly toward the crankshaft, a first side entry window opening and a second side entry window opening facing in the longitudinal direction, wherein the first and second side entry windows are defined by the bottom wall, a right side wall, a left side wall and a top edge of the lower section, wherein the top edge defines a top opening, wherein crankcase gasses flow into the first side entry window opening, the second side entry window, and through the top opening, wherein the crankcase gasses flow through the side entry windows and vertically up through the top opening, wherein the bottom wall restricts larger droplets of oil from entering the gallery, and
an upper section disposed above the lower section, the upper section including a plurality of ribs disposed in a horizontal plane between a fore side wall of the upper section and an aft side wall of the upper section, wherein the plurality of ribs are vertically spaced apart from each other, wherein each rib extends from a first wall of the oil gallery toward a second wall of the oil gallery to an opening defined between a distal end of the rib and the other of the first and second walls of the oil gallery, wherein openings are horizontally offset in a lateral direction, and wherein the plurality of ribs define a passage for crankcase gasses that flow between the first and second walls of the oil gallery in the lateral direction to separate oil particles from the crankcase gasses and return the oil particles to the crankcase, and wherein one of the plurality of ribs is disposed immediately above the top opening to return the oil particles through the top opening and back into the lower section.

2. The apparatus of claim 1 wherein the first and second side entry windows are disposed in a vertical plane between the fore and aft sides of the lower section of the baffle.

3. The apparatus of claim 1 wherein droplets of oil in the crankcase gasses are blocked by the bottom wall and returned to a crankcase.

4. The apparatus of claim 1 wherein the ribs are planar in shape.

5. The apparatus of claim 4 wherein the openings defined between the ribs and the walls of the galleries are offset from each other in a transverse direction, and wherein a flow path through the openings defined by the ribs is non-linear.

6. The apparatus of claim 1 wherein oil particles impinge upon the ribs and drain from the ribs back into a crankcase.

7. An apparatus comprising:
an oil separator having a front baffle and a rear baffle that are adapted to be mounted in an oil gallery of an internal combustion engine, wherein each of the front and rear baffles include a lower section, an upper section and a bridging section, wherein the bridging section connects the upper section of the front baffle to the upper section of the rear baffle, wherein the lower section of the front baffle and the lower section of the rear baffle extend below the upper section of the front baffle and the upper section of the rear baffle, respectively, wherein—
the lower sections of each of the front and rear baffles each include a bottom wall extending in a horizontal plane in the lateral and longitudinal directions to be oriented across a flow path of crankcase gasses vertically through a top opening in the lower section, wherein the lower section defines side openings extending vertically above the bottom walls and laterally between first and second sides of the oil gallery, wherein the crankcase gases flow through the side entry windows and vertically up through the top opening, and
the upper sections of the front and rear baffles each include front and rear walls that are disposed in a vertical plane and a transverse lateral plane, wherein a plurality of right side ribs extend between the front and rear walls on a right side of the oil gallery, wherein left side gas flow openings are defined by a distal end of the ribs and the left side of the oil gallery, wherein a plurality of left side ribs extend on a left side of the oil gallery, wherein right side gas flow openings are defined by a distal end of the ribs and the left side of the oil gallery, wherein crankcase gasses flow around a left side of the right side ribs and a right side of the left side ribs in a repeating pattern to separate oil particles from the crankcase gasses wherein the crankcase gases flow through the side entry windows and vertically up through the top opening, and wherein one of either the right side ribs or the left side ribs is disposed immediately above the top opening to return the oil particles through the top opening and back into the lower section.

8. The apparatus of claim 7 wherein the side openings are defined by the bottom wall, a right side wall, a left side wall and a top edge of the lower section.

9. The apparatus of claim 7 wherein the right side gas flow openings and the left side gas flow openings are rectangular.

10. The apparatus of claim 7 wherein the right and left side ribs are planar in shape and extend in a horizontal direction.

11. The apparatus of claim 10 wherein the right and left side gas flow openings defined between the distal end of the ribs and the walls of the galleries define a non-linear crankcase gas flow path.

12. The apparatus of claim 11 wherein oil particles drain from the ribs back into a crankcase.

13. The apparatus of claim 7 wherein the bridging section defines a fastener receiving opening and the apparatus further comprises:
a fastener received in the fastener receiving opening that is secured to the internal combustion engine.

14. An apparatus comprising:
an internal combustion engine including a crankcase, a cylinder block, a cylinder head that defines an oil gallery; and
a baffle assembled into the oil gallery, the baffle having a bottom wall facing the crankcase and right and left side walls extending above the bottom wall, wherein the bottom wall and the right and left side walls define at least two side openings, the baffle also includes a front wall and a rear wall that each define a top opening above the side openings and wherein the front and rear walls extend vertically above the side openings, the front wall and the rear wall each support a plurality of ribs that extend between the front and rear walls, wherein the plurality of ribs include right side ribs that define a plurality of left side openings between a first distal end of the right side ribs and a left side wall of the oil gallery, left side ribs that define a plurality of right side openings between a second distal end of the left side ribs and a right side wall of the oil gallery that form a gas flow path for crankcase gasses, wherein the gas flow path flows around a right side of left side ribs and a left side of a vertically adjacent right side ribs to separate oil particles from the crankcase gasses, and wherein one of either the right side ribs or the left side ribs is disposed immediately above the top opening to return the oil particles through the top opening and back into the lower section.

15. The apparatus of claim 14 further comprising:
a second baffle assembled into the oil gallery, the second baffle having a second bottom wall facing the crankcase and right and left second side walls extending above the second bottom wall at right and left edges of the second bottom wall, wherein the second bottom wall and the right and left second side walls define at least two second side openings, the second baffle also includes a second front wall and a second rear wall that each define a second top opening above the second side openings and wherein the front and rear walls extend vertically above the second side openings, the second front wall and the second rear wall each support a second plurality of ribs that extend between the second front and second rear walls, wherein the second plurality of ribs include second right side ribs that define a third plurality of second left side openings between a second distal end of the right side ribs and a second left side wall of the oil gallery, the second left side ribs define a fourth plurality of second right side openings between a second distal end of the second left side ribs and a second right side wall of the oil gallery that form a second gas flow path for the crankcase gasses, wherein the second gas flow path flows around a second right side of second left side ribs and a second left side of a vertically adjacent second right side ribs to separate oil particles from crankcase gasses, and wherein one of either the right side ribs or the left side ribs is disposed immediately above the top opening to return the oil particles through the top opening and back into the lower section.

16. The apparatus of claim 15 further comprising:
a bridging section connected to the baffle and the second baffle, wherein the bridging section defines a fastener receiving opening; and
a fastener received in the fastener receiving opening that is secured to the cylinder block.

17. The apparatus of claim 14 wherein the side openings are defined by the bottom wall, the right side wall, the left side wall and a bottom edge of the front wall and the rear wall.

18. The apparatus of claim 14 wherein oil particles drain from the right and left side ribs back into the crankcase.

19. The apparatus of claim 14 wherein the right and left side ribs are planar in shape and extend in a horizontal direction between a first wall of an oil gallery and the openings defined by the right and left side ribs and a second wall of the oil gallery.

20. The apparatus of claim 19 wherein the openings defined between the ribs and the walls of the galleries are offset from each other, and wherein the flow path through the openings defined by the ribs is non-linear.

* * * * *